United States Patent [19]

Smith

[11] Patent Number: 4,679,665
[45] Date of Patent: Jul. 14, 1987

[54] BRAKE DISC DESIGN FOR WHEEL MOUNTED DISCS

[75] Inventor: Roy E. Smith, Kingston, Canada

[73] Assignee: Urban Transportation Development Corporation Ltd., Canada

[21] Appl. No.: 831,740

[22] Filed: Feb. 21, 1986

Related U.S. Application Data

[63] Continuation of Ser. No. 615,646, May 31, 1984, abandoned.

[30] Foreign Application Priority Data

Mar. 12, 1984 [CA] Canada .................................. 449348

[51] Int. Cl.⁴ .............................................. F16D 65/12
[52] U.S. Cl. .................................. 188/218 XL; 188/59
[58] Field of Search ........ 188/218 XL, 218 A, 218 R, 188/71.5, 71.1, 73.2, 264 A, 264 AA, 17, 18 R, 18 A, 26, 38, 58, 59; 295/18, 20, 21, 1, 7; 301/6 R, 6.5, 6 E, 6 W, 6 CS, 67, 74; 192/107 R

[56] References Cited

U.S. PATENT DOCUMENTS

| | | |
|---|---|---|
| 373,213 | 11/1887 | Woodbury .......................... 295/21 X |
| 707,120 | 8/1902 | Killian .................................. 295/21 |
| 2,233,594 | 3/1941 | Eksergian .................... 188/264 A X |
| 2,350,970 | 6/1944 | Tack ............................ 188/264 A X |
| 2,485,082 | 10/1949 | Bachman ...................... 188/218 XL |
| 3,295,641 | 1/1967 | Eaton et al. .................. 188/218 XL |
| 3,530,960 | 9/1970 | Otto et al. . |
| 3,939,946 | 2/1976 | Pierre et al. .................. 188/218 XL |
| 4,006,803 | 2/1977 | Klein et al. .................. 188/264 A X |
| 4,018,311 | 4/1977 | Tickle ............................ 188/218 XL |
| 4,281,745 | 8/1981 | Wirth ............................ 188/218 XL |
| 4,501,346 | 2/1985 | Bogenschutz ................ 188/218 XL |

FOREIGN PATENT DOCUMENTS

| | | |
|---|---|---|
| 1215193 | 4/1966 | Fed. Rep. of Germany . |
| 1575749 | 1/1970 | Fed. Rep. of Germany ...... 188/218 XL |
| 1562753 | 3/1969 | France .......................... 188/218 XL |
| 1105370 | 3/1968 | United Kingdom ......... 188/218 XL |
| 1348976 | 3/1974 | United Kingdom . |

*Primary Examiner*—Duane A. Reger
*Attorney, Agent, or Firm*—Finnegan, Henderson, Farabow, Garrett & Dunner

[57] ABSTRACT

A brake disc for mounting to a railroad wheel or the like comprises a plurality of segments. Each segment is of part annular configuration and has two mounting tangs at a radially inner edge. Bolts pass through the mounting tangs to affix the segment to the wheel. The wheel is provided with an inwardly directed flange at its rim in order that retention tangs at the radially outer edge of the segment are captured between the flange and the web of the wheel. Under heat generated during braking the segment can expand radially outwardly. The segment is prevented from curling or warping in the axial direction by the flange of the wheel and the retention tangs. Preferably the mounting tangs have a part curved configuration so as to accommodate expansion of the segment by bending of the mounting tangs. The mounting tangs can be fitted with an axially extending lip so as to locate the segments and resist centrifugal forces during rotation.

15 Claims, 4 Drawing Figures

BRAKE DISC DESIGN FOR WHEEL MOUNTED DISCS

This is a continuation of application Ser. No. 615,646, filed May 31, 1984, now abandoned.

This invention relates to disc brakes and more particularly to a disc brake assembly including a segmented braking disc secured to a wheel for vehicles such as railway vehicles and the like.

It is known to mount braking discs on either side of a rotor, for example a railroad wheel, by bolts which pass through apertures in the wheel. See for example, U.S. Pat. No. 4,018,311 issued Apr. 19, 1977 to Girling Limited. It is also known that allowances must be made to accommodate thermal expansion and contraction of the brake discs under the heat generated during braking. In some cases in order to accommodate such thermal expansion, bolts securing the brake discs or segments thereof pass through the disc and through the wheel. The bolt may have a substantial clearance through holes in the wheel such that the disc transmits the braking load through the bolt to the wheel but at the same time the disc may move relative to the wheel to accommodate expansion and contraction arising under the braking, heating and cooling cycles.

In U.S. Pat. No. 4,018,311 to Girling Limited allowance is made for thermal expansion and contraction by mounting a segment of a braking disc on a wheel so as to prevent radially outward movement of the element relative to the wheel. This is achieved by mounting the segment at a pair of circumferentially spaced locations, the location points being chosen that when the element undergoes thermal expansion or contraction, there is substantially no movement of the element into or out of engagement with the mounting abutment and means.

It is generally desirable to provide a segmented braking disc in order that the disc can be mounted or demounted from a wheel without removing the wheel from its associated axle. However, upon using a segmented disc two separate problems occur arising from thermal expansion and contraction. Firstly, there is expansion and contraction in the radial direction as addressed in the above-noted patent. Also, there is a problem which arises from the fact that the heat is generated at a surface of the disc which is contacted by the braking pad. As the heat is generated at one surface of the disc segment, the segment may tend to warp, thus parts of the segment may tend to move in an axial direction and must be restrained if smooth braking is to be maintained.

According to the present invention there is provided a disc brake system in which a segmented disc is mounted on a wheel. The mounting means are such that the disc is free to expand outwardly in the radial direction under the influence of heat generated during the braking process. However, the disc segment is supported so as to maintain a planar configuration and prevent warping of the disc segment in the axial direction. According to a preferred embodiment of the invention, the segments of the braking disc are attached to a wheel by fixation through tangs which project radially inwardly from the segment. As the segment expands during the heating process accommodation for such expansion in the radial direction is provided by bending of the tangs. In addition, in the preferred embodiment the tangs have lips which locate the braking segments and help to position the segments against the centrifugal forces developed while the wheel and disc are rotating about the associated axle.

According to the invention there is provided a disc brake system which comprises a wheel, which wheel has a hub for mounting on an axle, a rim and a web. A disc which is to be engaged by a brake pad comprises a plurality of annular segments. Each of the disc segments comprises at least two spaced apart mounting tangs adjacent the radial inner edge. Each disc also has at least one retention tang (preferably a plurality) adjacent a radial outer edge. The wheel has a flange adjacent its rim which flange is spaced from the web of the wheel and projects toward the hub. This flange engages the retention tang or tangs. The retention tang or tangs are located between the web of the wheel and the flange when the segment is fastened in place. There is radial clearance between the tangs and the rim of the wheel so that the segment may expand radially outwardly under the effect of heat generated during braking. The disc segments are attached to the wheel by fastening means.

In the preferred embodiment of the invention the braking disc segment comprises mounting tangs having a part curved configuration with the fastening means comprising bolts passing through the mounting tangs with the mounting tangs having an "S" configuration. During the expansion of the segment under the effect of heat generated during braking, the segment will move outwardly. This outward movement is accommodated by bending of the S-shaped mounting tang. The segment is prevented from curling in the axial direction by the retention tangs one of which is located substantially centrally. In the preferred embodiment retention tangs are also located at the leading and trailing edges of the segment.

The invention will be better understood from reference to the following description of two preferred embodiments of the invention given by way of example and with reference to the accompanying drawings in which.

Figure 2:
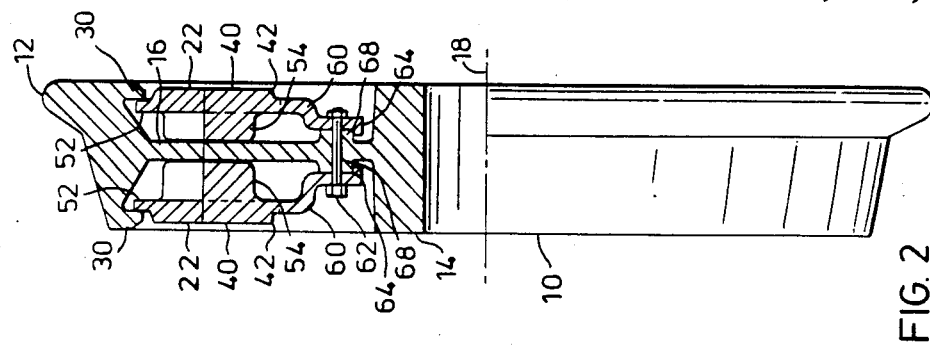
FIG. 2 is a compound section through the wheel and brake disc assembly of FIG. 1.

The brake disc assembly illustrated in the figures by way of example comprises a railroad wheel 10 having a rim 12 and a hub 14. The wheel 10 also comprises a central web portion 16 joining the rim 12 to the hub 14. The hub 14 serves to mount the wheel 10 on an axle (not illustrated) for rotation about the axis indicated by line 18.

Brake discs 20 are mounted on either side of the web 16 to provide a pair of surfaces against which the braking pads may bear. The braking pads and their associated caliper system are not shown in the drawings in order that the details of the mounting of the brake discs may be more clearly understood. It is believed those skilled in this area will be well familiar with the mounting of caliper brakes and the like.

Each brake disc 20 comprises a plurality of individual segments 22. In each of FIGS. 1 and 3 the brake disc 20 comprises four segments 22. The brake segments on each side of the web 16 are substantially identical. It is not necessary according to the invention to provide similar brake disc segments on both the inner and outer surfaces of the web 16 of the wheel. If desired a non-segmented brake disc may be used on the outside of the wheel. However, it is expected that for purposes of balancing the wheels and for the ease of assembly and disassembly of the entire braking system, like brake segments will be used on both the inner and outer faces of the web of the wheel.

The rim 12 of the wheel 10 is provided with a flange 30. It will be observed from FIGS. 2 and 4 that the flange 30 projects radially toward the axis 18 and that the flange 30 is spaced from the web 16. Flange 30 provides the support so as to eliminate any axial curling or warping of the brake disc segments 22 when heated.

Figure 1:
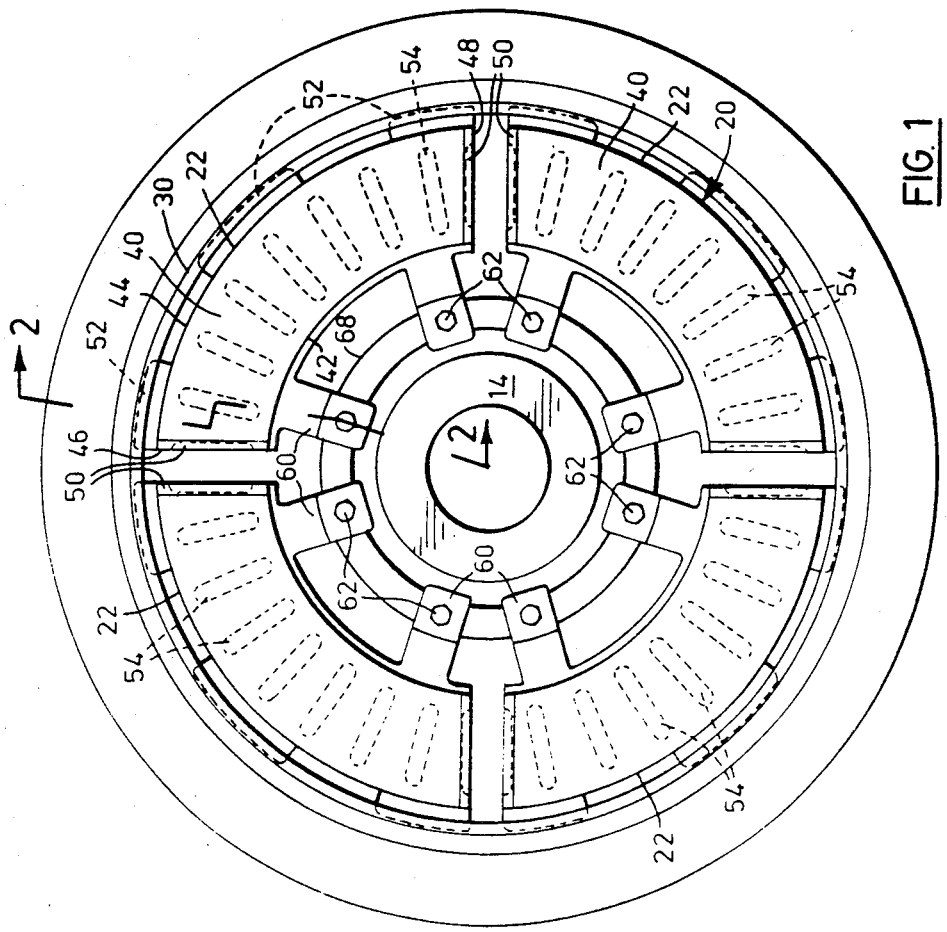
FIG. 1 is a side view of a railroad wheel and brake disc assembly mounted thereon.

Each brake disc segment 22 comprising a surface 40 which is adapted to be contacted by the pad carried by a brake caliper. The surface 40 will be ground to a suitable smoothness. The surface 40 comprises a radially inner edge 42, a radially outer edge 44 and leading and trailing edges. In FIG. 1 the trailing edge has been designated as 46 while the leading edge has been designated 48. There is no difference between these two edges, the definition of leading and trailing being established by the direction of intended rotation. In the usual practice, each of edges 46 and 48 have been chamfered as indicated at 50. The chamfered edges 50 provide smooth transition of the brake pad from one segment to another and also serve as wear indicators.

Each brak disc segment 22 comprises a plurality of retention tangs 52 located adjacent the radial outer edge 44. In the assembled condition illustrated in the figures the retention tangs 52 project toward the rim 12 and lie beneath the flange 30 of the wheel 10. It will be observed in FIGS. 2 and 4 that the retention tang 52 does not contact the rim 12. As the segment expands under the effect of heat generated during braking the segment will expand outwardly and sufficient clearance is provided between retention tang 52 and rim 12 so as to ensure that the retention tang 52 does not contact the rim 12. The flange 30 of the wheel 10 projects radially towards axis 18 a distance sufficient to ensure that the flange 30 overlies retention tangs 52 at all times regardless of the state of expansion or contraction of the segment 22.

Each brake disc segment 22 comprises a plurality of cooling fins 54 projecting axially from the segment toward the web 16 of wheel 10. The cooling fins 54 serve two important purposes.

The fins 54 as shown, contact the web 16 of the wheel 10. Thus, the segment 22 if firmly captured between the web 16 and the flange 30 of the wheel 10. The flange 30 and web 16 prevent any movement of the segment in the axial direction but permit movement of the segment in a radial direction.

If the cooling fins do not contact the web 16 of the wheel 10 then some other projection or boss should contact the web. In the preferred embodiment illustrated all the fins contact the web 16 and, accordingly, support the segment throughout its length. In order to prevent curling or warping of the segment, the segment should bear against the web 16 of the wheel at least at the leading and trailing edges 46 and 48. The portion of the segment that contacts the web may comprise any suitable boss, lug or abutment.

The second function of the cooling fins 54 is to provide for a flow of cooling air over the surface of the segment 22. As the fins are rotating with the wheel any ambient air trapped between the fins most of necessity rotate with the wheel. Thus, there is developed a centrifugal force on the air which will cause the air to move in a radially outward direction and thus encourage flow of air over this surface of the cooling segment. In order to expedite flow of cooling air the radial outer edge 44 is spaced from the inner edge of flange 30 so as to provide an exit for cooling air.

The heat of braking will be generated at the surface 40 of the segment 22. The heat will then flow in an axial direction through the segment 22 to the cooling fins 54. Thus, there will be a significant temperature difference between the surface 40 and the cooling fins 54. This temperature difference would cause the segment 22 to curl or warp in the axial direction with the leading and trailing edges attempting to move in an axial direction relative to the central portion of the segment which would tend to move in the axial opposite direction. For this purpose, advantageously there is at least one retention tang 52 located adjacent the central portion of the radial outer edge 44 and also adjacent each of the leading and trailing edges of the segment 22. Many other retention tangs 52 may be fitted to each disc as convenient. In the embodiment illustrated three such retention tangs are provided for each segment.

Each disc brake segment 22 is affixed to the wheel 10 by means of at least two spaced apart mounting tangs 60 adjacent the radial inner edge 42. As illustrated in each of FIGS. 2 and 4 mounting tangs 60 are advantageously S-shaped. Each of the mounting tangs comprises an aperture through which a mounting bolt 62 may be passed. Each mounting tang also comprises an axially extending lip 64 which serves to locate the mounting tang in the radial direction. The axial lip 64 serves not only to physically locate each of the segments 22 during the assembly process, but also serves to locate the segments against the very considerable centrifugal forces which develop as the wheel is rotating. By utilizing the axial lip, the centrifugal forces need not be passed to the mounting bolts. The mounting bolts 62 may thus be used to simply secure the segments to the wheel and to pass the braking forces from the disc segment to the wheel.

The mouning tangs 60 advantageously comprise an S-shaped section. With a curved configuration the expansion of the segment 22 is permitted by bending forces developed in the curved mounting tang 60. If the mounting tang were not curved, then the expansion of the segment 22 could only be accomplished by very considerable tensile forces generated in the mounting tang itself. By providing a curve to the mounting tang the tang is permitted to move under bending loads which, it is envisioned, are substantially less than would be generated in a straight tensile force generated displacement.

In the mounting system illustrated in FIGS. 1 and 2 the web 16 of the wheel 10 comprises an annular mounting boss 68. The mounting boss 68 comprises a series of apertures through which the mounting bolts 62 pass. The mounting boss 68 also defines an edge against which the axial lip 64 of the mounting tangs 60 may rest. Thus, the centrifugal forces caused by rotation of the wheel and disc is resisted by the mounting boss 68. In addition, the braking forces are passed from the segment 22 to the wheel 10 through the mounting boss 68. In this mounting system a single mounting bolt 62 may pass through the mounting boss 68 and the inner and outer segments 22 on each side of the wheel.

Figure 4:
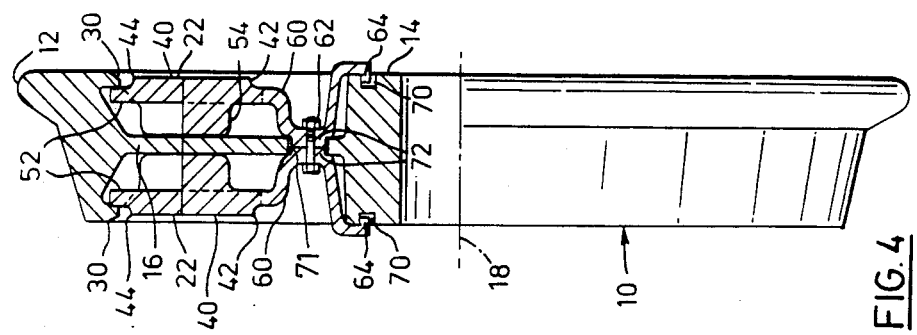
FIG. 4 is a compound section through the wheel and brake disc assembly of FIG. 3.
Figure 3:
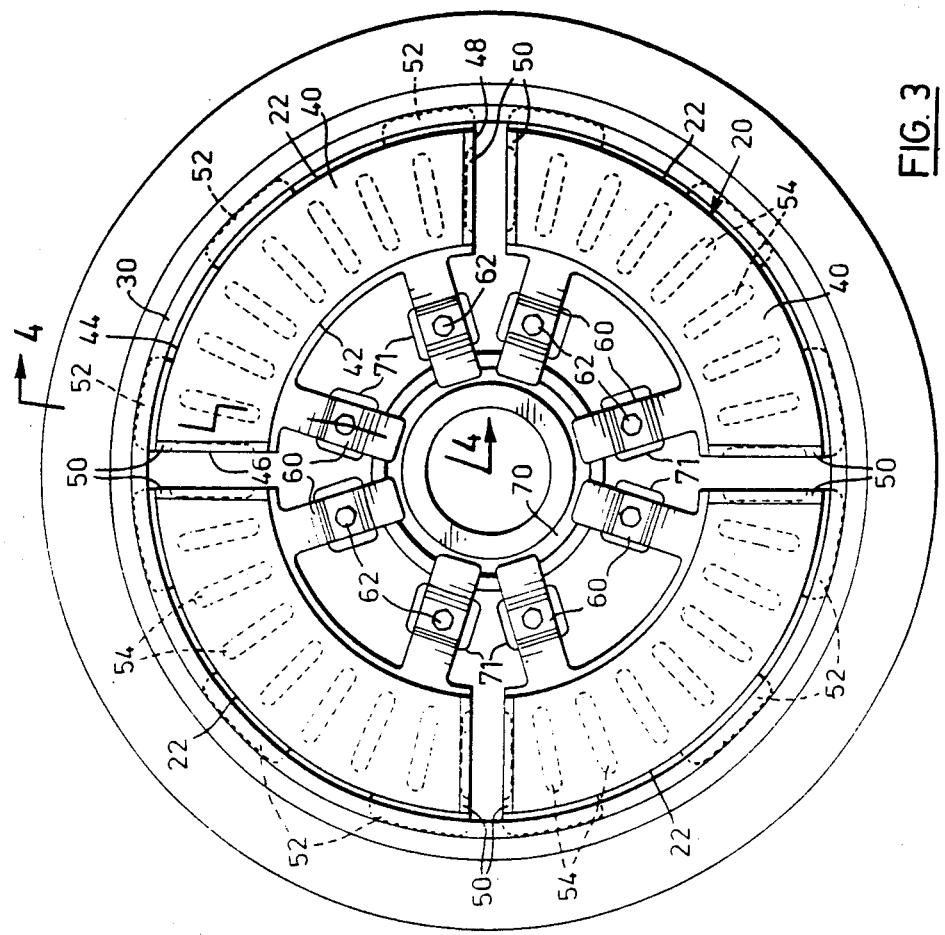
FIG. 3 is a side view of a railroad wheel and brake disc mounted thereon illustrating an alternate method of affixing the disc to the wheel.

In the mounting system illustrated in FIGS. 3 and 4 the hub 14 of wheel 10 comprises an annular groove 70 on either side of the wheel. The annular groove 70 accommodates the axial lip 64 of the mounting tang 60. As illustrated in FIGS. 3 and 4 a plurality of relatively large apertures 71 is provided in the web 16 of the wheel 10. The mounting tangs of the inner and outer brake segments comprise a pair of bosses 72 which abut when the inner and outer segments are bolted in place. The mounting bolt 62 passes through the bosses 72 of the mounting tangs 60 of the inner and outer brake disc segments. The bosses 72 bear against the periphery of the aperture 71 in the web 16. With this mounting system the centrifugal forces generated during rotation of the wheel are resisted by the hub 14 of the wheel. The forces generated during braking are passed from the segments 22 directly to the web of the wheel with only relatively minor forces being passed to the mounting bolt 62.

With each of the mounting systems illustrated in the preferred embodiments it will be observed that the brake disc segments can be relatively easily removed and replaced. The segments may be removed by removal of two mounting bolts 62. In order to assemble the device or to replace the segments the segment is brought axially toward the wheel and tipped so that the retention tang 52 is passed within the space defined by the web 16 and the flange 30. The segment 22 is then brought into full contact with the web of the wheel and the axial lip 64 is seated beneath the mounting boss 68 or within the annular groove 70. The mounting bolt 62 is then tightened.

As the segment becomes heated during the braking process the segment is free to expand in the radial direction outwardly. The segment cannot, however, move in the axial direction as such movement is precluded at the outer edge by the retention tangs 52 bearing against flange 30 and at the inner edge by the mounting tangs 60.

The number, placement and configuration of the mounting tangs and the retention tangs may be varied to suit the forces involved in any particular design. In addition, various other means may be fitted to the wheel and brake segments to accommodate the braking forces. By way of example, the braking forces may be passed from the segment to the wheel through various other forms of abutments and bosses or the like.

I claim:

1. A disc brake assembly, comprising:
    a wheel having a hub for mounting said wheel for rotation about an axis, a rim, and a web,
    a disc to be engaged by a brake pad, said disc comprising a plurality of annular disc segments, each of said disc segments having a leading edge, a trailing edge, a radially inner edge and a radially outer edge,
    each of said disc segments having at least two spaced apart mounting tangs adjacent said radially inner edge,
    said mounting tangs adapted to restrain substantially all centrifugal force applied to said segment when said assembly rotates about said axis,
    at least one retention tang adjacent said radially outer edge of each of said disc segments,
    each of said disc segments having abutment means adjacent said leading and trailing edges, said abutment means contacting said web of said wheel,
    said wheel having a flange adjacent said rim spaced from said web and projecting radially toward said hub for engaging said at least one retention tang of each of said disc segments, and
    fastening means for fixing each of said disc segments to said wheel,
    wherein said retention tangs project between said web and said flange of said wheel when said disc segments are fastened in place, said retention tangs are radially spaced from said rim and engage said flange so that said disc segments can freely expand radially away from said hub under the effect of heat generated during braking but may not move axially with respect to said web, and said retention tangs are radially movable relative to said flange when said disc segments expand radially outward under the effect of heat generated during braking.

2. The disc brake assembly of claim 1, wherein each of said brake disc segments includes a plurality of cooling fins extending in an axial direction toward said web.

3. The disc brake assembly of claim 2, wherein at least some of said cooling fins bear against said web.

4. The disc brake assembly of claim 3, wherein each of said mounting tangs has a curved configuration and includes a lip extending in the axial direction, said lip engaging said wheel.

5. The disc brake assembly of claim 4, wherein said wheel includes an annular groove for engaging said lips of said mounting tangs.

6. The disc brake assembly of claim 4, wherein said wheel includes an annular boss having a radially inner edge engaging said lips of said mounting tangs.

7. A disc brake assembly, comprising a wheel having a rim, a web, and a hub for mounting said wheel for rotation about an axis, said wheel having a flange projecting radially inwardly and spaced from said web; and an annular disc co-axial with said axis, said disc comprising a plurality of annular segments, each of said segments having:
    a surface adapted to be contacted by a brake pad;
    a radially inner edge, a radially outer edge, a leading edge, and a trailing edge;
    a plurality of mounting tangs adjacent said radially inner edge, said mounting tangs adapted to restrain substantially all centrifugal force applied to said segment when said assembly rotates about said axis, each of said mounting tangs including a lip for engaging said wheel and having a curved configuration whereby said segment may expand radially outwardly during heating under braking by bending said mounting tangs;
    fastening means for fixing said mounting tangs to said wheel;
    a plurality of retention tangs adjacent said radially outer edge and positioned between said web and said flange of said wheel, said retention tangs being radially spaced apart from said rim and contacting said flange, said retention tangs being radially movable relative to said flange when said segment expands radially outward under the effect of heat generated during braking, at least one of said retention tangs being located approximately midway circumferentially between said leading and trailing edges; and
    an abutment adjacent each of said leading and trailing edges, said abutments contacting said web of said wheel.

8. A part annular segment for a disc of a disc brake to be secured to a wheel having a rim, a web, and a hub for mounting said wheel for rotation about an axis, said wheel having a flange projecting radially inwardly and spaced from said web, said segment comprising:
   a braking surface adapted to be contacted by a brake pad;
   a radially inner edge, a radially outer edge, a leading edge, and a trailing edge;
   a plurality of mounting tangs adjacent said radially inner edge, said mounting tangs adapted to restrain substantially all centrifugal force applied to said segment when said assembly rotates about said axis, each of said mounting tangs including a lip for engaging said wheel and having a curved configuration whereby said segment may expand radially outwardly under the effect of heat generated during braking by bending said mounting tangs;
   at least one retention tang adjacent said radially outer edge for engaging said flange of said wheel; and
   abutment means adjacent said leading and trailing edges for engaging said web of said wheel.

9. The part annular segment of claim 8, wherein said retention tang includes an engagement surface for contacting said flange of said wheel, said engagement surface being substantially parallel to said braking surface.

10. A disc brake assembly, comprising:
   a. a wheel including a hub for mounting said wheel for rotation about an axis, a rim, a web connecting said rim to said hub, and a flange extending radially inwardly from said rim, said flange being spaced apart from said web;
   b. a plurality of annular disc segments to be engaged by a brake pad, each of said disc segments being mounted on said wheel and including:
   a leading edge, a trailing edge, a radially inner edge, and a radially outer edge,
   at least two spaced-apart mounting tangs extending substantially radially inwardly from said radially inward edge and adapted to be fastened to said wheel,
   abutment means for contacting said web of said wheel, and
   at least one retention tang extending radially outwardly from said radially outward edge, said retention tang projecting between said web and flange of said wheel, being radially spaced apart from said rim of said wheel, and contacting said flange of said wheel when said mounting tangs are fastened to said wheel so that said disc segment is restrained from moving axially with respect to said web and can expand radially outwardly with respect to said hub when heated during braking, said retention tang being radially movable relative to said flange when said disc segment expands during braking; and
   c. means for fastening each of said mounting tangs to said wheel.

11. The disc brake assembly of claim 10, wherein:
   said wheel includes an annular boss having a radially inner edge; and
   each of said mounting tangs includes a lip extending in the axial direction and engaging said radially inner edge of said boss.

12. The disc brake assembly of claim 11, wherein said fastening means includes a plurality of bolts each passing through one of said mounting tangs and said boss.

13. A disc brake assembly comprising:
   a. a wheel including a hub for mounting said wheel for rotation about an axis, a rim, a web connecting said rim to said hub, and first and second flanges extending radially inwardly from said rim, said flanges being positioned on axially opposite sides of said web and spaced apart from said web;
   b. first and second annular discs to be engaged by brake pads, said first and second discs being mounted on said wheel on axially opposite sides of said web corresponding to said first and second flanges, respectively, each of said disc comprising a plurality of disc segments and each of said disc segments including:
   a leading edge, a trailing edge, a radially inner edge, and a radially outer edge,
   at least two spaced-apart mounting tangs extending substantially radially inwardly from said radially inward edge and adapted to be fastened to said wheel,
   abutment means for contacting said web of said wheel, and
   at least one retention tang extending radially outwardly from said radially outward edge, said retention tang projecting between said web and one of said flanges of said wheel, being radially spaced apart from said rim of said wheel, and contacting said one flange of said wheel when said mounting tangs are fastened to said wheel so that said disc segment is restrained from moving axially with respect to said web and can expand radially outwardly with respect to said hub when heated during braking, said retention tangs being radially movable relative to said flange when said disc segment expands during braking; and
   c. means for fastening each of said mounting tangs to said wheel.

14. The brake disc assembly of claim 13, wherein:
   said web includes a plurality of circumferentially spaced apertures;
   each of said retention tangs of said first disc is circumferentially aligned with one of said mounting tangs of said second disc and with one of said apertures;
   each of said mounting tangs includes a boss extending into said aligned aperture and contacting said boss of said aligned mounting tang on the axially opposite side of said web; and
   said fastening means includes a plurality of bolts each passing through one of said aligned pairs of mounting tangs at said bosses.

15. The brake disc assembly of claim 13, wherein:
   said hub includes a pair of axially opposite faces each having an annular groove formed therein; and
   each of said mounting tangs includes a lip extending in the axial direction and engaging one of said annular grooves.

* * * * *